United States Patent [19]

Huhndorff

[11] Patent Number: 4,937,153

[45] Date of Patent: Jun. 26, 1990

[54] CELL CIRCUIT INTERRUPTER

[75] Inventor: Harry R. Huhndorff, Bay Village, Ohio

[73] Assignee: Eveready Battery Company, St. Louis, Mo.

[21] Appl. No.: 237,025

[22] Filed: Aug. 29, 1988

[51] Int. Cl.5 ............................................. H01M 2/00
[52] U.S. Cl. .................................... 429/61; 429/57; 429/59; 429/177
[58] Field of Search ............... 429/61, 57, 59, 62, 429/58, 66, 177; 320/46, 47, 30, 54

[56] References Cited

U.S. PATENT DOCUMENTS

| | | | |
|---|---|---|---|
| 2,651,669 | 9/1953 | Neumann | 429/58 |
| 3,081,366 | 3/1963 | Belove | 429/58 |
| 3,373,057 | 3/1968 | Jost et al. | 429/58 |
| 3,431,528 | 6/1954 | Richard | 337/414 |
| 3,617,386 | 11/1971 | Bosben et al. | 429/56 |
| 3,676,221 | 7/1972 | Bach | 429/67 |
| 3,775,661 | 11/1973 | Frezzolini et al. | 320/46 |
| 3,939,011 | 2/1976 | Zaleski | 429/54 |
| 4,025,696 | 5/1977 | Tucholski et al. | 429/61 |
| 4,028,478 | 6/1977 | Tucholski | 429/61 |
| 4,035,552 | 7/1977 | Epstein | 429/58 |
| 4,690,879 | 9/1987 | Huhndorff | 429/61 |
| 4,756,983 | 7/1988 | Tucholski | 429/61 |

FOREIGN PATENT DOCUMENTS 1172309  8/1984  Canada ............................. 429/157

Primary Examiner—Anthony Skapars
Attorney, Agent, or Firm—Virgil B. Hill

[57] ABSTRACT

The invention relates to a galvanic cell having a failsafe circuit interrupter means for electrically isolating one cover terminal of the cell from the cell's electrochemical system when the closed end of the container of the cell bulges beyond a predetermined amount.

46 Claims, 1 Drawing Sheet

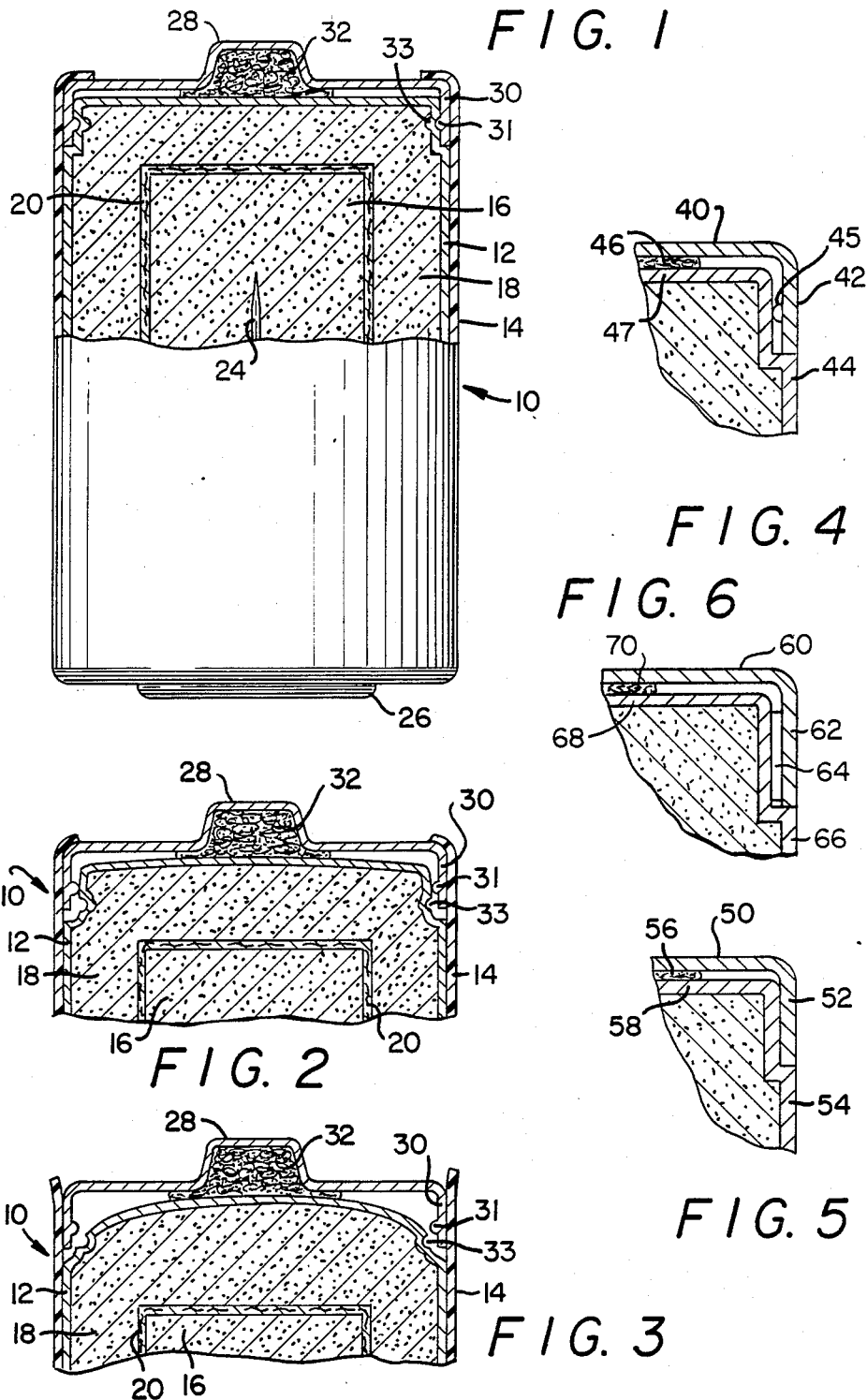

CELL CIRCUIT INTERRUPTER

FIELD OF THE INVENTION

The invention relates to a galvanic cell and more specifically to a cylindrical galvanic cell having a failsafe circuit interruption means for electrically isolating one terminal of the cell from the cell's electrochemical system when the closed end of the cylindrical container bulges beyond a predetermined amount.

BACKGROUND OF THE INVENTION

Galvanic cells, such as alkaline cells, are generally designed to vent when the internal pressure exceeds a predetermined amount. When exposed to an abuse condition, such as being charged to an excessive degree, the cell is designed to vent and allow gas to escape. Under certain abuse conditions, electrolyte entrained in the gas may be forced from the cell. It is preferable to have the electrolyte escape rather than have the cell rupture from internal pressure buildup.

Cell manufacturers have used a number of approaches to resolve the problem of expelling electrolyte during venting. One of the most common methods of preventing seal rupture due to abuse charging or the like is to insert a diode in the battery's electrical circuit. By eliminating the possibility of charging the cells, internal gas is not generated and the seal never ruptures. Another electrically related mechanism is a belleville shaped "flip switch". This device is triggered by bulging of the closed end of the cell's cylindrical container which causes a washer to invert and thereby break electrical contact. Another method involves the use of absorbents or electrolyte thickeners. The absorbent materials are usually located outside the seal area and beneath the cell's cover or jacket. As electrolyte escapes from a ruptured seal, the liquid is absorbed. Spew thickeners are mixed with the electrolyte and therefore are contained within the cell. The objective of the thickener is to slow down and/or absorb any leakage that may occur. The disadvantage of using either an absorbent or a thickener is that both materials tie up space that otherwise could be used for active materials of the cell. A third procedure is to use an outer container and end covers as an electrolyte containment system to provide space to contain the electrolyte that may escape.

U.S. Pat. No. 3,676,221 discloses a battery comprising a plurality of stacked, disc-like sealed cells secured together by cups fitted over one cell and having bottoms spot-welded to the next cell and sidewalls spot-welded to the interfitting cell. A heat-shrunk sheath encloses the battery and has caps forming the poles. Between each pair of cells is a circular disc of insulating material against which the cup bottoms bulge upon expansion of the contents of the cells, thereby breaking the welds and electrically disconnecting the cells.

U.S. Pat. No. 4,025,696 describes a disc shaped washer which inverts after the bottom bulge exceeds a predetermined value. Prior to activation, the washer's inside diameter is slanted toward the container. As the container bulges, the bottom of the container pushes against the washer and eventually causes the washer to invert. This inversion electrically separates the bottom cover from the container. An open circuit is the net result.

U.S. Pat. No. 3,775,661 describes a cell in which internal pressure forces a diaphragm against a switch which electrically disconnects a charging device. The diaphragm is located inside a venting device which is attached to one end of the cell.

U.S. Pat. No. 2,651,669 describes a bulge activated switch that can be incorporated into a single cell battery or a multiple cell battery and operable such that the bulge can be used to open a switch or switches that control the cell's discharging and/or charging circuits.

U.S. Pat. No. 3,617,386 describes a cell in which a thin sheet of metal with "spring back" ability is positioned between the seal and cover of the cell so as to break the cell's electrical circuit when the bulge becomes excessive.

U.S. Pat. No. 3,081,366 describes a sealed cell having a metallic sheet member connected to one cell electrode and its periphery insulating affixed to an open casing end and an overlying exposed metallic terminal insulating held over the sheet member. A movable switch portion normally connects an intermediate pressure deflectable sheet member portion to the external terminal and, in response to outward motion of the deflected sheet portion under excess internal pressure the switch portion disconnects the external terminal from the deflected sheet portion.

U.S. Pat. No. 3,373,057 describes a cell in which the cover of the casing of the cell is provided centrally with an inwardly concave-contact button. A dished (which is to say concaveconvex) snap-acting spring disc of the automatic reset type is marginally sealed to the inside of the cover. An automatic reset disc after snapping in one direction in response to pressure on its convex side will return with snap action when the pressure is relieved. The disc is provided centrally with a sealed movable contact for engagement and disengagement with an internal fixed contact when the disc snaps to and fro. The arrangement is such that when the contacts are engaged the disc is slightly sprung toward the cover but short of causing snap action. This maintains good electrical contact pressure under safe internal gas pressures. The fixed contact is electrically connected with one set of battery plates and the other set of plates is electrically connected with the casing.

U.S. Pat. No. 4,690,879 describes a cylindrical galvanic cell employing a unitary type cover welded to the container as a failsafe circuit interruption means for electrically isolating one terminal of the cell from the cell's electrochemical system when the bottom of the cylindrical cell bulges beyond a predetermined amount so that the unitary cover breaks electrical contact with the housing of the cell.

It is therefore an object of this invention to provide a galvanic cell with means for electrically isolating one terminal of the cell from the cell's electrochemical system upon reaching a predetermined bulge in the cell's housing.

Another object of this invention is to provide means for electrically isolating one terminal of a galvanic cell from the cell's electrochemical system upon reaching a predetermined bulge in the cell's housing and that will occupy a minimum space requirement so as not to diminish the space allocated for the active components of the cell.

Another object of this invention is to provide a sealed galvanic cell with means for electrically isolating one terminal of the cell from the electrochemical system of the cell upon reaching a predetermined bulge in the cell's housing and that is easy to make, cost effective and easy to assemble.

The foregoing and additional objects will become more fully apparent from the following description and the accompanying drawing.

SUMMARY OF THE INVENTION

The invention relates to a sealed galvanic cell comprising a conductive container having an upstanding wall open at one end and closed at the opposite end and including in said container a positive electrode, a negative electrode and an electrolyte, and said conductive container being in electrical contact with one of said electrodes; a first cover mounted over said open end of said conductive container, said first cover being secured to and electrically insulated from said conductive container and in electrical contact with the other electrode; an electrically insulating material disposed at the central area of the closed end of the conductive container leaving the external surface of the upstanding wall adjacent the closed end of the conductive container exposed; a rigid conductive second cover terminating with a dependant flange such that the rigid second cover forceably slides onto and is secured to the closed end of the container by an interference fit between the dependant flange and upstanding wall adjacent the closed end of the container thereby adapting said second cover as the terminal for the electrode in electrical contact with said conductive container; and wherein the closed end of the conductive container will bulge upon a predetermined pressure buildup within the conductive container to force the second rigid cover to slide off the container and break the electrical contact between the inner surface of the dependant flange and the outer surface of the upstanding wall thereby breaking the electrical contact between the second rigid cover and the electrode in electrical contact with said conductive container.

An interference fit between the second cover and the closed end of the container can be obtained by having the projected area defined by the inner surface of the dependant flange and disposed perpendicular to the longitudinal axis of the container overlap the projected area defined by the external surface of the upstanding wall of the container adjacent the closed end of the container and disposed perpendicular to the longitudinal axis of the container.

In a preferred embodiment of the invention, the interference fit of the second cover to the closed end of the container could be accomplished by having a positive disturbance such as a rim or spaced apart projected tips or longitudinal ribs in the external surface of the upstanding wall of the container adjacent its closed end and/or in the internal surface of the dependant flange of the second cover. A requirement when using this arrangement is that the positive disturbance provide an interference fit when the cover is forceably slid onto the closed end of the container. When using a projected rim on the internal surface of the depending flange, a groove could be disposed in the external surface of the container, so that the cover can be forceably slid on the container due to the interference fit until the projected rim snaps into the groove of the container. This rim and groove arrangement is still considered an interference fit in accordance with this invention. However, a positive disturbance in the inner surface of the dependant flange, such as a projected circumferential rim or spaced apart projected tips or longitudinal ribs would be sufficient to provide the interference fit when forceably slid onto the smooth surface of the upstanding wall of the container adjacent the closed end of the container.

Another embodiment of this invention would be a sealed galvanic cell comprising a conductive container having an upstanding wall open at one end and closed at the opposite end and including in said container a positive electrode, a negative electrode and an electrolyte, and said conductive container being in electrical contact with one of said electrodes; a first cover mounted over said open end of said conductive container, said first cover being secured to and electrically insulated from said conductive container and in electrical contact with the other electrode; an electrically insulating material disposed at the central area of the closed end of the conductive container leaving the external surface of the upstanding wall adjacent the closed end of the conductive container exposed, said external surface of the upstanding wall adjacent the closed end of the container having a surface disturbance; a rigid second cover terminating with a dependant flange in which the internal surface of the dependant flange has a surface disturbance adapted for mating in engagement with the surface disturbance on the upstanding wall such that when the second cover is placed onto the closed end of the container the disturbance in the flange will snap into engagement with the disturbance of the upstanding wall of the container so that the second cover is secured onto and in electrical contact with the container thereby adapting said second cover as the terminal for the electrode in electrical contact with said conductive container; and wherein the closed end of the conductive container will bulge upon a predetermined pressure buildup within the conductive container to force the second cover to unsnap and slide off from the container which will break the engagement between the disturbance in the flange and the upstanding wall of the container thereby breaking the electrical contact between the second cover and the electrode in electrical contact with said conductive container.

Surface disturbance shall mean a groove, at least one dimple, at least one extending projected tip or longitudinal rib, a projected circumferential rim, or any combination thereof. The groove, projected rim could comprise two or more spaced apart grooves or rims, respectively, encompassing an arc type segment on the external surface area of the upstanding wall of the container or on the internal surface of the dependant flange of the second cover. A requirement of the disturbances, if used, is that if a groove is disposed on the upstanding wall of the container then a projected rim could be disposed on the internal surface of the flange so that the projected rim could snap into the groove in the upstanding wall thereby securing the cover to the container. In a similar manner, the groove could be disposed on the internal surface of the flange and the projected rim could then be disposed on the external surface of the upstanding wall of the container. Likewise, if at least two spaced apart dimples are disposed on the container then at least two spaced apart projected tips could be disposed on the inner surface of the flange of the cover. If spaced apart projected tips were disposed on the container then spaced apart dimples could be disposed on the inner surface of the flange of the cover. If desired, a groove could be disposed on the upstanding wall of the container in which two or more spaced apart projected tips could be disposed on the inner surface of the flange of the cover. A necessary requirement when using a disturbance in the cover and a disturbance in the container is that the disturbances be adapted for mating engagement so that the flange of the cover can be forceably slipped over and onto the closed end of the container in an interference fit and then snapped into securing engagement so that the cover is secured onto and in electrical contact with the container. The type of mating disturbances on the upstanding wall of the container and the flange of the cover is selected so that when a predetermined pressure buildup within the container occurs, the closed end of the container will bulge and dislodge or unsnap the disturbances and then slip the cover off from the container so that the electrical contact between the container and cover is broken. The particular type or combination of disturbances will depend on the material used for the container and/or cover, the degree of the disturbance in the surface of the container and/or cover, and the force required to unsnap or disengage the disturbances. Thus by selecting the appropriate type of disturbances for the cover and container of a particular size cell and cell system, the cell can be made to vent at a predetermined pressure buildup within the cell.

Preferably, the groove or dimple should be disposed in the upstanding wall of the container with the rim or projected tip being disposed in the internal surface flange of the cover so that when the cover is forceably slid onto the closed end of the container and the rim or tip snaps into the groove or dimple, respectively, the external surface of the flange will be free of projections. Another preferable embodiment of the invention would have the upstanding wall of the container adjacent the closed end of the container indented by an amount equal to or greater than the thickness of the flange of the cover. In this embodiment, when the cover is forced onto the closed end of the container, the flange of the cover will be placed onto the indented portion of the container so that the flange would be in alignment with the overall circumferential surface of the container. This will produce a cell having a relatively constant outer peripheral wall.

As used herein, the electrically insulating material could be a disc made of plastic tape, paper, ceramic or it could be a layer of an electrically nonconductive adhesive. When an insulating material is a disc, the disc could be conductive or nonconductive provided that if it is conductive it must be secured to the closed end of the conductive container using a nonconductive adhesive. In some applications the disc could also be secured to the conductive cover by conventional means.

The conductive cover should preferably be rigid so that as the closed end of the container bulges, the conductive cover will remain relatively flat thereby assuring that it will slide or unsnap so that the cover will break electrical contact with the conductive container. In other words, the bulge of the closed end of the container will be sufficient to slide the cover from the container and force the flange of the conductive cover away from and electrically insulated from the conductive container.

The insulating material could be an electrically nonconductive adhesive that secures the inner area of the conductive cover to the closed end of the container. Suitable nonconductive adhesives for this invention are acrylic type adhesives, epoxy type adhesives, cyanoacrylate type adhesives and the like. Also suitable are hot melt adhesives such as asphalt. Another suitable nonconductive adhesive is double sided tape.

The nonconductive adhesive should be applied so that it bonds the conductive cover to the closed end of the container with sufficient strength to prevent tipping of the conductive cover when the cell bulges. In addition, the nonconductive adhesive must allow direct electrical contact to be made between the upstanding wall adjacent the closed end of the container and the peripheral flange of the conductive cover. If desired, a plastic film could encase the cell and extend over the edge of the conductive cover. The plastic film could be the conventional heat shrinkable film made from a material such as polyvinyl chloride, polyvinylidene chloride and polyolefins such as polyethylene and polypropylene.

In a preferred embodiment, the container would be a cylindrical container, the electrically insulating material would be a nonconductive adhesive and the conductive cover would be a disc-shaped member with a dependant flange. The simple design of the circuit interrupter means of this invention provides a number of unique features. First, when a nonconductive adhesive is employed, it could be easily applied as a layer between about 0.001 inch and 0.05 inch thick, preferably between about 0.01 inch and about 0.02 inch thick. Thus the circuit breaker means will generally require little or no additional space within the cell since the conductive cover can function as a cover for the cell.

The subject invention will effectively eliminate electrolyte leakage due to abusive charging or overdischarging, does not require an additional electrical component, is relatively simple to incorporate into a manufacturing process, and effectively does not take up any usable space within the cell's interior. In a preferred embodiment, an electrically nonconductive adhesive should be used to secure only a portion of the conductive cover to the container. This adhesive performs two functions. First, the adhesive holds the cover substantially perpendicular to the cell's longitudinal axis and second, the adhesive electrically insulates the cover from the conductive container after the closed end of the container bulges and breaks electrical contact between the flange of the conductive cover and the container.

In some applications the control of the degree of bulge to slide or unsnap the flange of the cover from the container could be somewhat critical. For commercial applications, the flange should not be unsnapped or slid from the container when the amount of bulge is that which normally could occur when the cell is subject to high temperature storage. Thus the degree of bulge should generally be beyond the normal bulge that can be encountered in high temperature storage but below the degree of bulge that will break the seal and let electrolyte escape. For example, in a standard type alkaline D-size cylindrical cell (2.277 inches high and 1.318 inches diameter), the bottom of the container can bulge as much as 0.025 inch when stored at 71° C. for an eight (8) week period and can vent when the bulge exceeds 0.070 inch. Consequently, for this size and type cell system, the interference fit should be selected so that the second cover generally slides off the container when the bulge in the closed end of the container is between about 0.030 and about 0.070 inch.

This invention is ideally suited for alkaline cells employing a $MnO_2$ positive electrode, a zinc negative electrode and an electrolyte solution comprising potassium hydroxide.

The present invention will become more apparent from the following description thereof when considered together with the accompanying drawing which is set forth as being exemplary of the present invention and is not intended to be limitative thereof in any respect.

BRIEF DESCRIPTION OF THE DRAWINGS

FIG. 1 is an elevational view partially in cross-section of an alkaline manganese dioxide/zinc cell embodying a circuit interrupter means of the present invention.

FIG. 2 is an elevational view of part of the cell in FIG. 1 showing the bottom closed end of the container with a slight bulge insufficient to lift the cover away from contact with the container.

FIG. 3 is an elevational view of part of the cell in FIG. 2 showing the cover lifted off the container.

FIG. 4 in an enlarged fragmentation view of another embodiment of this invention showing a circuit interruption means of the present invention FIG. 5 is an enlarged fragmentation view of another embodiment of this invention showing a circuit interruption means of the present invention.

FIG. 6 is an enlarged fragmentation view of another embodiment of this invention showing a circuit interruption means of the present invention.

Referring now to FIGS. 1–3 in which a typical alkaline galvanic cell 10 of the present invention is shown comprising an inverted metallic cupped container 12 provided, if desired, with an outer plastic shrink film 14. Disposed within the container 12 is an anode 16, a cathode 18, a separator 20 and an alkaline electrolyte which permeates the anode 16, cathode 18, and separator 20, respectively. An anode current pin type collector 24 extends lengthwise within the cell 10, parallel to the longitudinal axis of the cell, from a location in contact with the anode 16 to the negative end 26 of the cell 10 where it terminates.

A cup-shaped cover 28 is shown with its peripheral depending flange 30 secured onto the peripheral area of the upstanding wall of container 12 through the use of projected rim 31 on the inner surface of flange 30 mating within groove 33 disposed on the upstanding wall of container 12. Prior to placing cover 28 onto the container 12, an electrically nonconductive adhesive 32 such as asphalt is placed between the closed end of container 12 and cover 28 over an area sufficient so that only the inner area of cover 28 will contact the electrically nonconductive adhesive 32 thereby leaving the inner surface of flange 30 of cover 28 in electrical contact with the upstanding wall of container 12. Shrink film 14 can then be shrunk over the cell and onto the peripheral area of cover 28.

FIG. 2 shows the beginning of the bulge in cell 10 but insufficient to lift cover 28 away from container 12 to unsnap and slide the rim 31 and groove 33 securing engagement in which the cover 28 is in electrical contact with the container.

After a predetermined amount of bulge occurs that is designed to unsnap and slide the rim on flange 30 of cover 28 out from the groove 33 in the upstanding wall of container 12, the cover 28 slides away from electrical contact with container 12 as shown in FIG. 3. As evident from FIG. 3, cover 28 is still secured to container 12 via electrically nonconductive adhesive 32 but its electrical contact is broken thereby electrically isolating cover 28 from the container 12. By designing the degree of bulge to unsnap and slide the cover 28 from the container 12, this invention can effectively isolate the terminal cover 28 from the circuit of the cell prior to the cell venting or rupturing which would cause electrolyte to escape.

FIG. 4 shows another embodiment of the invention in which a cup-shaped cover 40 has a peripheral flange 42 with a plurality of spaced apart projected tips 45 extending from its inner surface. A cell container is shown as 44 with its upstanding wall indented at the closed end of the container to accommodate the thickness of the flange 42. Also shown is the nonconductive adhesive 46 disposed between the center of cover 40 and the bottom surface 47 of container 44. In this embodiment, the projected tips 45 provide an interference fit when cover 40 is forceably slid onto the closed end of container 44. After a predetermined amount of bulge occurs in the container 44, the cover 40 will be pushed off and slide from the container 44 to break the electrical contact with the container 44. This will effectively electrically isolate cover 40 from the circuit of the cell prior to the cell venting or rupturing which could cause electrolyte to escape.

FIG. 5 shows another embodiment of the invention in which a cover 50 has a pheripheral flange 52 forceably slid onto the closed end of container 54. Container 54 is shown with its upstanding wall indented to accommodate the thickness of the flange of cover 50. Also shown is the nonconductive adhesive 56 disposed between the center of cover 50 and the bottom surface 58 of container 54. In this embodiment, the projected area defined by the inner surface of flange 52 and disposed perpendicular to the longitudinal axis of container 54 is less than or overlaps the projected area defined by the external surface of the upstanding wall of container 54 adjacent its closed end (indented circumferential surface) and disposed perpendicular to the longitudinal axis of container 54 so that the cover 50 has to be forceably slid onto the closed end of container 54. This interference fit secures the cover 50 to container 54. After a predetermined amount of bulge occurs in container 54, the cover 50 will be pushed away and slide from container 54 thereby breaking the electrical contact with container 54. This will effectively electrically isolate cover 50 from the circuit of the cell prior to the cell venting or rupturing which could cause electrolyte to escape.

FIG. 6 shows another embodiment of the invention in which a cup-shaped cover 60 has a peripheral flange 62 with a plurality of spaced apart projected longitudinal ribs 64 extending from its inner surface. A cell container is shown as 66 with its upstanding wall indented at the closed end of the container to accommodate the thickness of the flange 62. Also shown is the nonconductive adhesive 70 disposed between the center of cover 60 and the bottom surface 68 of container 66. In this embodiment, the longitudinal ribs 64 provide an interference fit when cover 60 is forceably slid onto the closed end of container 44. After a predetermined amount of bulge occurs in the container 66, the cover 60 will be pushed off and slide from container 66 to break the electrical contact with container 66. This will effectively electrically isolate cover 60 from the circuit of the cell prior to the cell venting or rupturing which could cause the electrolyte to escape.

Although the present invention has been described with reference to particular details, it is not intended that these details shall be construed as limiting the scope of this invention.

What is claimed:

1. A sealed galvanic cell comprising a conductive container having an upstanding wall open at one end and closed at the opposite end and including in said container a positive electrode, a negative electrode and an electrolyte, and said conductive container being in electrical contact with one of said electrodes; a first cover mounted over said open end of said conductive container, said first cover being secured to and electrically insulated from said conductive container and in electrical contact with the other electrode; an electrically insulating material disposed at the central area of the closed end of the conductive container leaving the external surface of the upstanding wall adjacent the closed end of the conductive container exposed, a rigid conductive second cover terminating with a dependant flange such that the rigid second cover forceably slides onto and is secured to the closed end of the container by an interference fit thereby adapting said second cover as the terminal for the electrode in electrical contact with said conductive container; and wherein the closed end of the conductive container will bulge upon a predetermined pressure buildup within the conductive container to force the second cover to slide off and break the electrical contact between the inner surface of the depending flange and the outer surface of the upstanding wall thereby breaking the electrical contact between the second cover and the electrode in electrical contact with said conductive container.

2. The galvanic cell of claim 1, wherein the internal surface of the flange of said second cover has a projected disturbance.

3. The galvanic cell of claim 2, wherein the projected disturbance on the inner surface of the flange of the second cover is at least one disturbance selected from the group consisting of a projected tip, a projected longitudinal rib and a projected circumferential rim.

4. The galvanic cell of claim 1, wherein the external surface of the upstanding wall of the container adjacent the closed end has a projected disturbance.

5. The galvanic cell of claim 4, wherein the projected disturbance on the external surface of the upstanding wall of the container adjacent the closed end is at least one disturbance selected from the group consisting of a projected tip, a projected longitudinal rib and a projected circumferential rim.

6. The galvanic cell of claim 1, wherein the internal surface of the second cover has a surface disturbance; said external surface of the upstanding wall of the container adjacent its closed end has a surface disturbance and said disturbance in the surface of the flange is adapted for mating in engagement with the surface disturbance in the upstanding wall of the container.

7. The galvanic cell of claim 6, wherein the surface disturbance in the external surface of the upstanding wall of the container is a groove and the surface disturbance in the internal surface of the dependant flange of the second cover is a rim.

8. The galvanic cell of claim 6, wherein the surface disturbance in the external surface area of the upstanding wall of the container is at least two spaced apart dimples and the surface disturbance in the internal surface of the dependent flange is at least two spaced apart projected tips.

9. The galvanic cell of claim 6, wherein the surface disturbance in the external surface of the upstanding wall of the container is a groove and the surface disturbance in the internal surface of the dependant flange of the second cover is at least two projected tips.

10. The galvanic cell of claim 9, wherein the container is a cylindrical container and the groove is composed of at least two spaced apart arcuate grooves.

11. The galvanic cell of claim 1, wherein said electrically insulating material is an electrically nonconductive adhesive.

12. The galvanic cell of claim 11, wherein the electrically nonconductive adhesive is selected from the group consisting of acrylic adhesive and epoxy adhesive.

13. The galvanic cell of claim 2, wherein said electrically insulating material is an electrically nonconductive adhesive.

14. The galvanic cell of claim 13, wherein the electrically nonconductive adhesive is selected from the group consisting of acrylic adhesive and epoxy adhesive.

15. The galvanic cell of claim 4, wherein said electrically insulating material is an electrically nonconductive adhesive.

16. The galvanic cell of claim 15, wherein the electrically nonconductive adhesive is selected from the group consisting of acrylic adhesive and epoxy adhesive.

17. The galvanic cell of claim 6, wherein said electrically insulating material is an electrically nonconductive adhesive.

18. The galvanic cell of claim 17, wherein the electrically nonconductive adhesive is selected from the group consisting of acrylic adhesive and epoxy adhesive.

19. The galvanic cell of claim 11, wherein the electrically nonconductive adhesive is a hot melt adhesive.

20. The galvanic cell of claim 19, wherein the hot melt adhesive is asphalt.

21. The galvanic cell of claim 11, wherein the electrically nonconductive adhesive is double-sided tape.

22. The galvanic cell of claim 13, wherein the electrically nonconductive adhesive is a hot melt adhesive.

23. The galvanic cell of claim 22, wherein the hot melt adhesive is asphalt.

24. The galvanic cell of claim 13, wherein the electrically nonconductive adhesive is double-sided tape.

25. The galvanic cell of claim 15, wherein the electrically nonconductive adhesive is a hot melt adhesive.

26. The galvanic cell of claim 25, wherein the hot melt adhesive is asphalt.

27. The galvanic cell of claim 15, wherein the electrically nonconductive adhesive is double-sided tape.

28. The galvanic cell of claim 17, wherein the electrically nonconductive adhesive is a hot melt adhesive.

29. The galvanic cell of claim 28, wherein the hot melt adhesive is asphalt.

30. The galvanic cell of claim 17, wherein the electrically nonconductive adhesive is double-sided tape.

31. The galvanic cell of claim 1, wherein said container is a cylindrical container.

32. The galvanic cell of claim 1, wherein said container is in electrical contact with a positive electrode and said first cover electrically insulated from the container is in electrical contact with a negative electrode.

33. The galvanic cell of claim 1, wherein said container is in electrical contact with a negative electrode and said first cover electrically insulated from the container is in electrical contact with a positive electrode.

34. The galvanic cell of claim 1, wherein one of said electrodes is $MnO_2$, the other of said electrodes is zinc and said electrolyte solution comprises potassium hydroxide.

35. The galvanic cell of claim 2, wherein said container is a cylindrical container.

36. The galvanic cell of claim 4, wherein said container is a cylindrical container.

37. The galvanic cell of claim 6, wherein said container is a cylindrical container.

38. The galvanic cell of claim 2, wherein said container is in electrical contact with a positive electrode and said first cover electrically insulated from the container is in electrical contact with a negative electrode.

39. The galvanic cell of claim 4, wherein said container is in electrical contact with a positive electrode and said first cover electrically insulated from the container is in electrical contact with a negative electrode.

40. The galvanic cell of claim 6, wherein said container is in electrical contact with a positive electrode and said first cover electrically insulated from the container is in electrical contact with a negative electrode.

41. The galvanic cell of claim 2, wherein said container is in electrical contact with a negative electrode and said first cover electrically insulated from the container is in electrical contact with a positive electrode.

42. The galvanic cell of claim 4, wherein said container is in electrical contact with a negative electrode and said first cover electrically insulated from the container is in electrical contact with a positive electrode.

43. The galvanic cell of claim 6, wherein said container is in electrical contact with a negative electrode and said first cover electrically insulated from the container is in electrical contact with a positive electrode.

44. The galvanic cell of claim 2, wherein one of said electrodes is $MnO_2$, the other of said electrodes is zinc and said electrolyte solution comprises potassium hydroxide.

45. The galvanic cell of claim 4, wherein one of said electrodes is $MnO_2$, the other of said electrodes is zinc and said electrolyte solution comprises potassium hydroxide.

46. The galvanic cell of claim 4, wherein one of said electrodes is $MnO_2$, the other of said electrodes is zinc and said electrolyte solution comprises potassium hydroxide.

* * * * *